United States Patent
Hugler

(10) Patent No.: US 6,671,955 B2
(45) Date of Patent: Jan. 6, 2004

(54) METHOD FOR TREATING BODIES AFTER SEPARATION BY BREAKING

(75) Inventor: Eberhard Hugler, Aalen (DE)

(73) Assignee: Alfing Kessler Sondermaschinen GmbH, Aalen (DE)

( * ) Notice: Subject to any disclaimer, the term of this patent is extended or adjusted under 35 U.S.C. 154(b) by 78 days.

(21) Appl. No.: 10/117,933

(22) Filed: Apr. 8, 2002

(65) Prior Publication Data

US 2002/0162205 A1 Nov. 7, 2002

Related U.S. Application Data

(63) Continuation of application No. PCT/EP00/10177, filed on Oct. 16, 2000.

(30) Foreign Application Priority Data

Oct. 18, 1999 (DE) ......................................... 199 50 140

(51) Int. Cl.$^7$ ............................................... B21D 53/84
(52) U.S. Cl. ................ 29/888.09; 29/416; 29/DIG. 46; 29/821
(58) Field of Search ...................... 29/888.09, DIG. 46, 29/413, 6.01, 416, 417, 821; 225/97, 100, 103; 74/579 R, 579 E, 579 F; 123/197.3, 197.4

(56) References Cited

U.S. PATENT DOCUMENTS

| 4,702,403 | A |   | 10/1987 | Curles |
| 5,105,538 | A | * | 4/1992  | Hoag et al. |
| 5,320,265 | A | * | 6/1994  | Becker |
| 5,974,663 | A | * | 11/1999 | Ikeda et al. |
| 6,457,621 | B1 | * | 10/2002 | Hahnel et al. |

FOREIGN PATENT DOCUMENTS

| DE | 40 37 429 A1 |   | 5/1992 |
| DE | 195 34 360 C2 |   | 8/1996 |
| EP | 1084784 | * | 3/2001 |
| WO | WO 9420765 A |   | 9/1994 |

* cited by examiner

Primary Examiner—Gregory Vidovich
Assistant Examiner—Eric Compton
(74) Attorney, Agent, or Firm—Wolf, Greenfield & Sacks, P.C.

(57) ABSTRACT

When bodies such as connecting rods, bearings, ring-shaped housings or similar are separated by breaking, material particles are torn out of the broken surface. These particles initially continue to adhere to the broken surface at first, before becoming detached from the broken surface and falling out when a force is exerted subsequently. According to the invention, the bodies are subjected to a vibration treatment after they have been separated by breaking in order to prevent detachable adhering particles of the material from falling out in an uncontrolled manner.

13 Claims, 1 Drawing Sheet

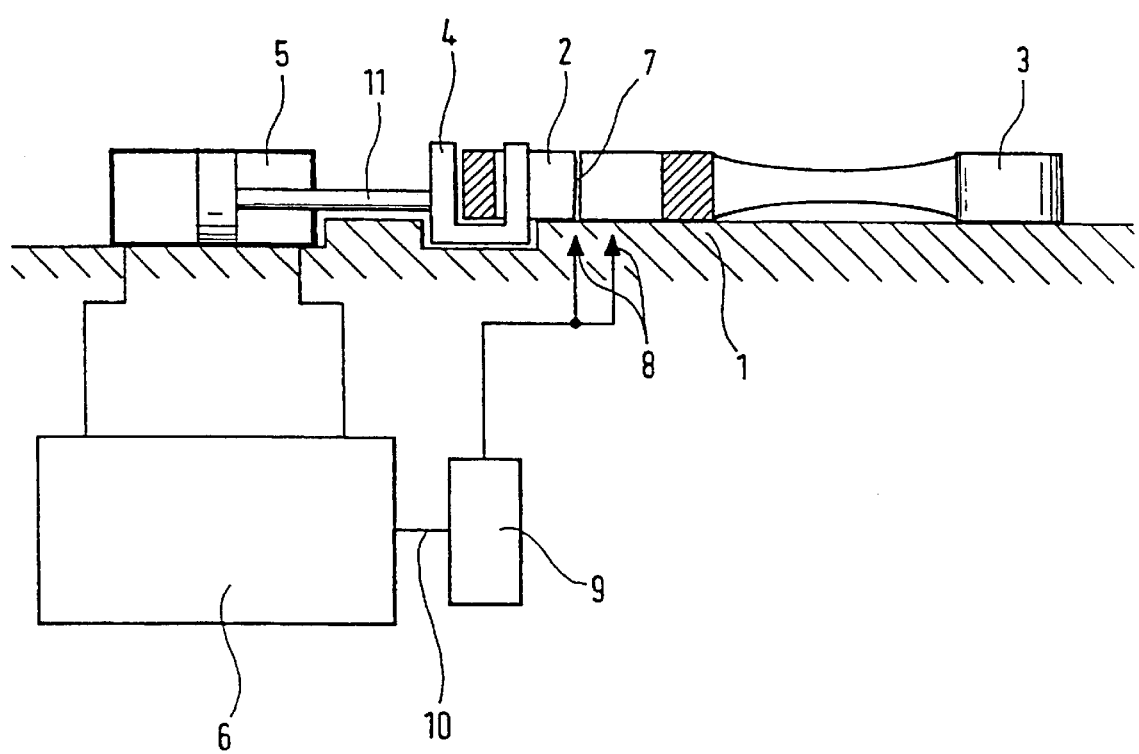

METHOD FOR TREATING BODIES AFTER SEPARATION BY BREAKING

FIELD OF THE INVENTION

The present invention relates to a method for treating bodies after crack splitting and a device for carrying out this method.

BACKGROUND OF THE INVENTION

When crack splitting bodies, such as connecting rods, bearings, annular housings and the like, the material is subjected to what is called a forced rupture. This does not always result in a continuous, uniform crack even if the breaking notches are arranged in the crack splitting plane. It rather occurs that material particles are torn out from the crack surface during the splitting process, which initially adhere to the crack surface, but detach from the crack surface and fall out when a force acts upon the crack surfaces, as is the case, for example, when tightening the bolts of connecting rods or operating connecting rods later.

Such fall-outs occur in particular in the marginal areas of crack surfaces and can, in case the bodies concerned are bearings, even cause damage to these.

SUMMARY OF THE INVENTION

It is thus the object of the invention to provide a method and a device for preventing uncontrolled fall-out of loose or still partially adhering material particles.

This object is solved according to the invention by a method in which at least part of the crack-split body is subjected to a vibration treatment.

The invention is based on the idea of detaching adhering material particles from the crack surface by way of vibration treatment, and to subsequently convey these away from the crack surface area.

The vibration treatment can take place, dependent on the material of the connecting rod, within different frequency ranges. Tests have shown a frequency range of up to 20 Hz, in special cases up to 50 Hz, to be particularly suitable for vibration treatment.

The entire body can, as a matter of principle, be exposed to the vibration treatment. It is, however, expedient to hold part of the body during the vibration treatment, and to cause the remaining part to vibrate.

Various procedures are suitable for conveying away the detached material particles. Particularly good results are obtained by exposing the crack surfaces to air blast, especially in pulsating form.

The excitation for the vibration treatment can be generated in various manners, according to the requirements of each case. Thus, both pneumatic or hydraulic as well as electric or mechanical excitation are possible.

Good results are obtained if those parts of the body that are subject to the vibration treatment are clamped in and are mounted to slide within limits only in the excitation direction.

It is also advantageous if during vibration treatment, both parts of the body slightly contact each other in the area of the crack surfaces.

In principle, the vibration treatment can take place with or without the arrangement of additional elements, such as connecting rod bolts in the case of connecting rods. To the extent that the connecting rod bolts have already been screwed in a preceding operation, these bolts must be loosened by a few rotations prior to the vibration treatment, and tightened again after the vibration treatment.

It is another object of the invention to provide a device suitable for carrying out the said method.

According to the invention, such a device comprises a means for holding the bodies as well as a vibration means acting upon the bodies fixed on said holding means.

In this arrangement, the holding means can be designed in many different ways. It is of advantage, however, to tightly clamp part of the body, i.e. the rod in the case of e.g. a connecting rod, in the holding means, and to move only the other part, i.e. the cap, relative to the rod by means of the vibration means.

To apply air blast, it is of advantage to provide a blowing means having nozzles. These nozzles can be configured in many different ways. It is, however, essential that they do not only convey the separated material particles away, but also contribute to their detachment from the crack surface.

BRIEF DESCRIPTION OF THE DRAWING

For better understanding of the invention, an embodiment of a device for carrying out the method in accordance with the invention will now be briefly explained and described with reference to the enclosed diagrammatic drawing.

The only FIGURE is a diagrammatic lateral view of a device in accordance with the invention for crack splitting connecting rods.

DETAILED DESCRIPTION

The device comprises a holding means 1 on which the connecting rod consisting of cap 2 and rod 3 rests.

In the present embodiment, the rod 3 is fixed on the holding means 1 by way of means that are not shown. These means can comprise, for instance, a mandrel in the area of the small big-end bore, stops or similar holding means, which secure the rod against displacement in the plane of the contact surface of the holding means 1.

Moreover, a cylinder 5 is secured to the holding means 1, which is connected with its piston via a piston rod 11 to an engaging member 4.

The engaging member 4 is configured essentially U-shaped and includes the cap 2 on the side of the connecting rod opposite the rod 3.

The cylinder 5 is connected to a control unit 6 via lines, which forms a vibration means together with the cylinder 5.

The device is moreover provided with a blowing means 9 connected to nozzles 8 via lines, which nozzles are arranged such that they can apply an air blast to the crack surfaces 7 between the cap 2 and the rod 3.

In the present embodiment, the control unit 6 is connected to the blowing means 9 via a control line 10.

If loose or slightly adhering particles are to be removed from the crack surfaces, the control unit 6 is activated, thereby causing a reciprocating movement of the cylinder 5. The respective frequency of this reciprocating movement can be adjusted according to the specific circumstances of each case by means of the control unit 6. The reciprocating movement of the piston of the cylinder 5 is transferred to the engaging member via the rod 11, the engaging member causing a reciprocal movement also of cap 2 of the connecting rod. The stroke of this reciprocating movement is adjusted so that the cap slightly contacts with its crack surfaces the crack surfaces of the rod. In this manner, loose or slightly adhering particles are detached from the crack surface and carried off by the air blast emerging from the nozzles 8.

To achieve a controlled vibration treatment, it is of advantage to also fix the cap 2, just as the rod 3, on the holding means. These means are not illustrated in the FIGURE. Fixing takes place in that the cap can only slide within limits on the holding means 1 in the effective direction of the engaging member 4, it being, however, for the most part fixed in all other directions.

What is claimed is:

1. A method for treating bodies after crack splitting, comprising:

clamping first and second parts of a crack-split body together, such that crack surfaces of the crack-split body are in contact; and performing a vibration treatment on the clamped crack-split body, wherein crack surfaces of the crack-split body are in contact during the vibration treatment.

2. A method as set forth in claim 1, characterized in that the vibration treatment takes place within a frequency range of up to 10 Hz.

3. A method as set forth in claim 1, characterized in that the vibration treatment takes place within a frequency range of up to 20 Hz.

4. A method as set forth in claim 1, characterized in that the vibration treatment takes place within a frequency range of up to 50 Hz.

5. A method as set forth in claim 1, characterized in that the first part is held and the second part is caused to vibrate.

6. A method as set forth in claim 1, characterized in that an air blast is applied to the crack surfaces during the vibration treatment.

7. A method as set forth in claim 1, characterized in that the air blast is pulsating.

8. A method as set forth in claim 1, characterized in that the excitation for the vibration treatment is pneumatic.

9. A method as set forth in claim 1, characterized in that the excitation for the vibration treatment is electrical.

10. A method as set forth in claim 1, characterized in that the excitation for the vibration treatment is hydraulic.

11. A method as set forth in claim 1, characterized in that the excitation for the vibration treatment is mechanical.

12. A method as set forth in claim 1, characterized in that the vibration treatment is performed in an excitation direction and in that the parts of the body subject to vibration are clamped in so as to slide within limits in the excitation direction.

13. A method as set forth in claim 1, wherein the crack-split body comprises a cap and rod and wherein connecting rod bolts are screwed in before or after crack splitting the cap and rod, further comprising loosening said connecting rod bolts prior to the vibration treatment and tightening said connecting rod bolts after the vibration treatment.

* * * * *

UNITED STATES PATENT AND TRADEMARK OFFICE
CERTIFICATE OF CORRECTION

PATENT NO. : 6,671,955 B2
DATED : January 6, 2004
INVENTOR(S) : Hugler

It is certified that error appears in the above-identified patent and that said Letters Patent is hereby corrected as shown below:

Column 4,
Line 6, delete "claim 1" insert -- claim 6 -- .

Signed and Sealed this

Fourth Day of May, 2004

JON W. DUDAS
*Acting Director of the United States Patent and Trademark Office*